United States Patent
Tang

(10) Patent No.: US 7,886,101 B2
(45) Date of Patent: Feb. 8, 2011

(54) INTERRUPTION CONTROL SYSTEM AND METHOD

(75) Inventor: Wei-Der Tang, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 103 days.

(21) Appl. No.: 12/344,264

(22) Filed: Dec. 25, 2008

(65) Prior Publication Data

US 2010/0146179 A1    Jun. 10, 2010

(30) Foreign Application Priority Data

Dec. 4, 2008    (CN) .................... 2008 1 0305973

(51) Int. Cl.
*G06F 13/24* (2006.01)
(52) U.S. Cl. .................... 710/260; 710/200; 710/240; 710/306
(58) Field of Classification Search ......... 710/260–269, 710/240–244, 200, 305–306, 100
See application file for complete search history.

(56) References Cited

U.S. PATENT DOCUMENTS 6,772,260 B2 *  8/2004  Kawase et al. .............. 710/264

* cited by examiner

*Primary Examiner*—Thomas J Cleary
*Assistant Examiner*—Kim T Huynh
(74) *Attorney, Agent, or Firm*—Zhigang Ma

(57) ABSTRACT

An interruption control system includes two sense elements, a microprocessor, and a controller. The microprocessor includes two registers, two flip-latches, a multiplexer, and a microcontroller. Each sense element senses a device and sends a sense signal. The corresponding register receives and stores the sense signal. The microcontroller sets an identity signal for each of the registers and controls the each of the flip-latch units to record a data signal of the device. The multiplexer alternately outputs the ID signals and the corresponding data signals to the microcontroller to encode into a datagram. The microcontroller sends the datagram to the controller. The controller is interrupted for decoding the datagram.

4 Claims, 2 Drawing Sheets

INTERRUPTION CONTROL SYSTEM AND METHOD

BACKGROUND

1. Technical Field

The present disclosure relates to control systems and control methods and, more particularly, to an interruption control system and an interruption control method.

2. Description of the Related Art

In a computer numerical control (CNC) system, cutters are significant components used for machining metal workpieces. Generally, the cutters need to be measured before machining. The process of measuring cutters interrupts work of at least that section of the CNC system which uses the cutters. However, resources for controlling interruption of the work of the CNC are limited and unable to handle the large number of interruptions needed to measure the cutters simultaneously, thus a lot of time could be wasted.

What is desired, therefore, is to provide an interruption control system and an interruption control method which overcome the above problem.

DETAILED DESCRIPTION

Figure 1:
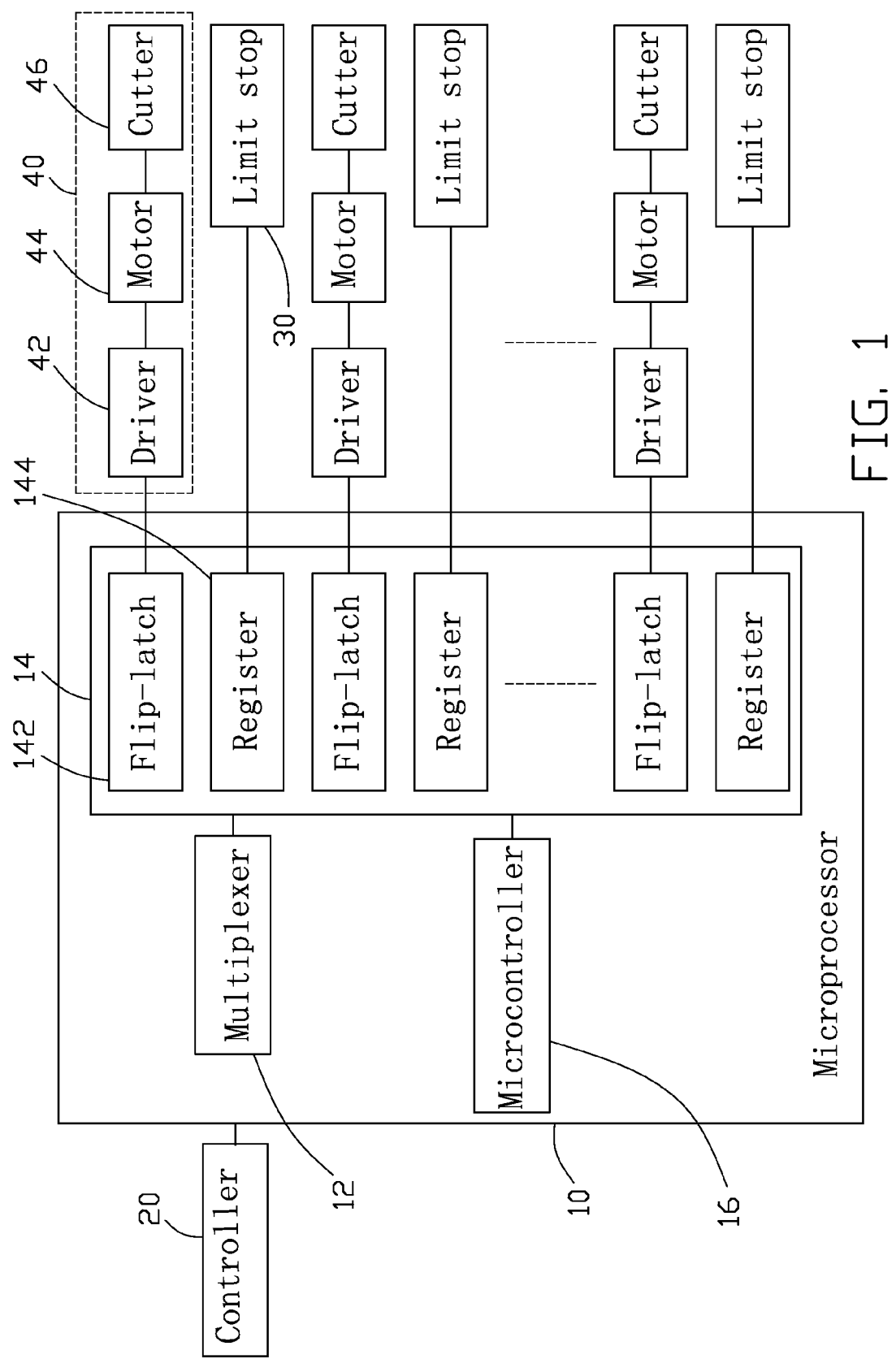
FIG. 1 is a block diagram of an exemplary embodiment of an interruption control system.

Referring to FIG. 1, an exemplary embodiment of an interruption control system for measuring a plurality of motor devices 40 includes a microprocessor 10, and an interruption source, such as a controller 20, connected to the microprocessor 10. The microprocessor 10 includes a multiplexer 12, a storage module 14, and a microcontroller 16. The storage module 14 includes a plurality of flip-latches 142 and a plurality of registers 144. Each of the plurality of registers 144 corresponds to one of the plurality of flip-latch 142. Each of the plurality of registers 144 is connected to a sense element such as a limit stop 30. Each of the flip-latch 142 is connected to a corresponding motor device 40.

Each of the plurality of motor devices 40 includes a driver 42, a motor 44, and a tool such as a cutter 46. The driver 42 is connected to a corresponding flip-latch 142. The motor 44 is connected between the driver 42 and the cutter 46.

The driver 42 is configured for driving the motor 44 to rotate, causing the cutter 46 to move. Each of the limit stops 30 is configured for sensing the corresponding cutter 46. In measuring, when the cutter 46 blocks light to the corresponding limit stop 30, the limit stop 30 outputs a sense signal to the corresponding register 144. The microcontroller 16 is configured for setting an identity (ID) signal for each register 144. The register 144 is configured for storing the sense signal and the corresponding ID signal. The corresponding flip-latch 142 is configured for reading and recording a data signal sent by an encoder of the motor 44. The microcontroller 16 is also configured for controlling the corresponding flip-latch 142 to record the corresponding data signal. The data signal indicates a length of the cutter 46. The multiplexer 12 is configured for receiving the ID signals of the plurality of registers 144 and the corresponding data signals stored in the plurality of flip-latches 142, and alternately outputting the ID signals and the corresponding data signals. A procedure having an encoding form standard is set in the microcontroller 16, which can encode the signals output by the multiplexer 12 into a datagram. The controller 20 is interrupted when it receives the datagram, for stopping a present work of the controller 20 to decode the datagram.

Figure 2:
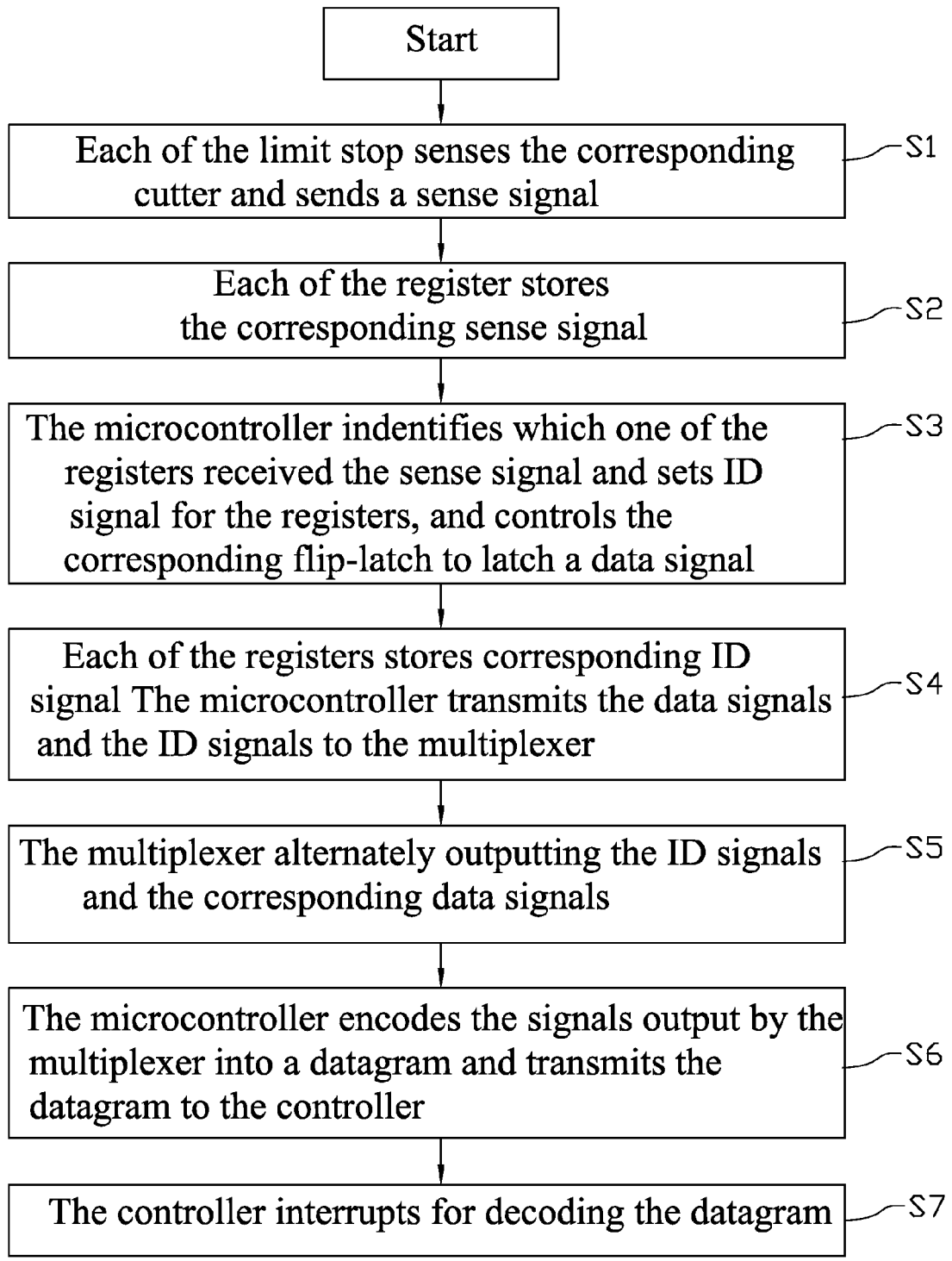
FIG. 2 is a flowchart of an exemplary embodiment of an interruption control method of the interruption control system of FIG. 1.

Referring to FIG. 2, an exemplary interruption control method utilizing the above-mentioned interruption control system for simultaneously measuring a plurality of cutters includes the follow steps.

In step S1, each of the limit stops 30 senses the corresponding cutter 46, and sends a sense signal to the corresponding register 144 when the limit stop 30 senses the cutter 46.

In step S2, each register 144 receives and stores the sense signal from the corresponding limit stop 30.

In step S3, the microcontroller 16 indentifies which one of the plurality of registers 144 received the sense signal and sets an ID signal for each register 144 having received the sense signal, and controls the corresponding flip-latch 142 to record a data signal sent by the encoder of the corresponding motor 44.

In step S4, the register 144 stores the corresponding ID signal.

In the same step, the microcontroller 16 transmits the data signals and the corresponding ID signals to the multiplexer 12.

In step S5, the multiplexer 12 receives the data signals and the ID signals and alternately outputs the ID signals and the corresponding data signals. In step S6, the microcontroller 16 encodes the signals output by the multiplexer 12 into a datagram according to the procedure having an encoding form standard, such as {ID} {data} {ID} {data} { . . . } {CRC (Cyclic Redundancy Check)}, to transmit the datagram to the controller 20.

In step S7, the controller 20 is interrupted when it receives the datagram for decoding the datagram.

In one embodiment, the datagram is decoded by the controller 20 into a number of data signals and ID signals. A difference value between a first data signal and a last data is a length of the cutter measured. Another encoding form standard can be set in the microcontroller 16 to encode the data signals and the corresponding ID signals.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An interruption control system for measuring at least two devices, comprising:

at least two sense elements, each of the at least two sense elements being configured for sensing one of the at least two devices and sending a sense signal in response to the status of the device;

a microprocessor comprising:

at least two registers configured for storing corresponding sense signals of the at least two sense elements and their own identity (ID) signals;

at least two flip-latches configured for reading and recording data signals of the at least two devices;

a multiplexer configured for alternately outputting the ID signals and the corresponding data signals; and a microcontroller configured for identifying which one of the at least two registers received the sense signal, setting an identity (ID) signal for the one of the at least two registers, controlling each of the at least two flip-latches to record the corresponding data signal, controlling the multiplexer alternately to output the ID signals and the corresponding data signals, and encoding the ID signals and the data signals into a datagram; and a controller configured for receiving the datagram to interrupt, and decoding the datagram.

2. The interruption control system of claim 1, wherein the sense elements are limit stops.

3. The interruption control system of claim 1, wherein each of the at least two devices comprises a motor, a tool driven by the motor, and a driver for driving the motor.

4. An interruption control method comprising:

sensing at least two devices and sending at least two sense signals to at least two registers, respectively;

identifying which one of the registers received the corresponding sense signal to set an identity (ID) signal for each of the at least two registers received the sense signal, and controlling each of at least two flip-latches to record a data signal of each of the at least two devices;

storing the corresponding ID signal;

outputting each of the ID signals and the corresponding data signals to a multiplexer;

alternatively outputting each of the ID signals and the corresponding data signals by the multiplexer;

encoding the ID signals and the data signals into a datagram and outputting the datagram to a controller;

interrupting via the controller; and decoding the datagram via the controller.

* * * * *